(12) United States Patent
Kanade et al.

(10) Patent No.: US 10,019,907 B2
(45) Date of Patent: Jul. 10, 2018

(54) UNMANNED AERIAL VEHICLE OBSTACLE DETECTION AND AVOIDANCE

(71) Applicant: Qualcomm Incorporated, San Diego, CA (US)

(72) Inventors: Parag Mohan Kanade, San Diego, CA (US); Charles Wheeler Sweet, III, San Diego, CA (US); Jeffrey Baginsky Gehlhaar, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 14/989,428

(22) Filed: Jan. 6, 2016

(65) Prior Publication Data
US 2017/0076616 A1 Mar. 16, 2017

Related U.S. Application Data

(60) Provisional application No. 62/217,685, filed on Sep. 11, 2015.

(51) Int. Cl.
G01C 23/00 (2006.01)
G05D 1/00 (2006.01)
G05D 3/00 (2006.01)
G06F 7/00 (2006.01)
G06F 17/00 (2006.01)
G08G 5/04 (2006.01)
G08G 5/00 (2006.01)
G06K 9/66 (2006.01)
G06K 9/00 (2006.01)
(Continued)

(52) U.S. Cl.
CPC ............ *G08G 5/045* (2013.01); *G06K 9/0063* (2013.01); *G06K 9/00697* (2013.01); *G06K 9/4628* (2013.01); *G06K 9/4652* (2013.01); *G06K 9/66* (2013.01); *G08G 5/0069* (2013.01); *B64C 2201/141* (2013.01)

(58) Field of Classification Search
CPC ...... G08G 5/045; G05D 1/101; G05D 1/0202; G01C 21/165
USPC .................... 701/3, 26, 469, 2, 23; 340/435
See application file for complete search history.

(56) References Cited

U.S. PATENT DOCUMENTS 5,461,357 A * 10/1995 Yoshioka .................. B60T 7/22
                                                      180/167
5,581,250 A * 12/1996 Khvilivitzky ........... G01S 11/12
                                                      340/945
(Continued)

FOREIGN PATENT DOCUMENTS

WO 2014194345 A1 12/2014

OTHER PUBLICATIONS

Dey D., et al., "Passive, Long-Range Detection of Aircraft: Towards a Field Deployable Sense and Avoid System," Proceedings Field & Service Robotics (FSR '09), Jul. 2009, 11 pages.
(Continued)

Primary Examiner — Mahmoud S Ismail
(74) Attorney, Agent, or Firm — Paradice and Li LLP/Qualcomm

(57) ABSTRACT

Apparatuses and methods for detecting an obstacle in a path of an Unmanned Aerial Vehicle (UAV) are described herein, including, but not limited to, receiving data from a single image/video capturing device of the UAV, computing a score based on the received data, and performing at least one obstacle avoidance maneuver based on the score.

30 Claims, 9 Drawing Sheets

(51) Int. Cl.
   *G06K 9/46*     (2006.01)
   *G01C 22/00*    (2006.01)
   *B60Q 1/00*     (2006.01)

(56) References Cited

U.S. PATENT DOCUMENTS

| | | | |
|---|---|---|---|
| 9,442,485 B1* | 9/2016 | McDermott | G05D 1/0094 |
| 2007/0093945 A1* | 4/2007 | Grzywna | G05D 1/101 |
| | | | 701/23 |
| 2008/0243383 A1* | 10/2008 | Lin | G01C 21/165 |
| | | | 701/469 |
| 2010/0100269 A1* | 4/2010 | Ekhaguere | G05D 1/101 |
| | | | 701/26 |
| 2012/0296497 A1* | 11/2012 | Lee | G05D 1/0202 |
| | | | 701/3 |
| 2014/0163781 A1 | 6/2014 | Vian et al. | |
| 2015/0336667 A1* | 11/2015 | Srivastava | B64C 39/024 |
| | | | 701/2 |
| 2016/0167226 A1* | 6/2016 | Schnittman | B25J 5/00 |
| | | | 382/153 |

OTHER PUBLICATIONS

Frew E.W., et al., "Flight Demonstrations of Self-directed Collaborative Navigation of Small Unmanned Aircraft," AIAA 3rd "Unmanned Unlimited" Technical Conference, Workshop and Exhibit, Sep. 20-23, 2004, AIAA 2004-6608, 14 pages.
Gokce F., et al., "Vision-Based Detection and Distance Estimation of Micro Unmanned Aerial Vehicles," Sensors, Sep. 18, 2015, vol. 15, pp. 23805-23846.

* cited by examiner

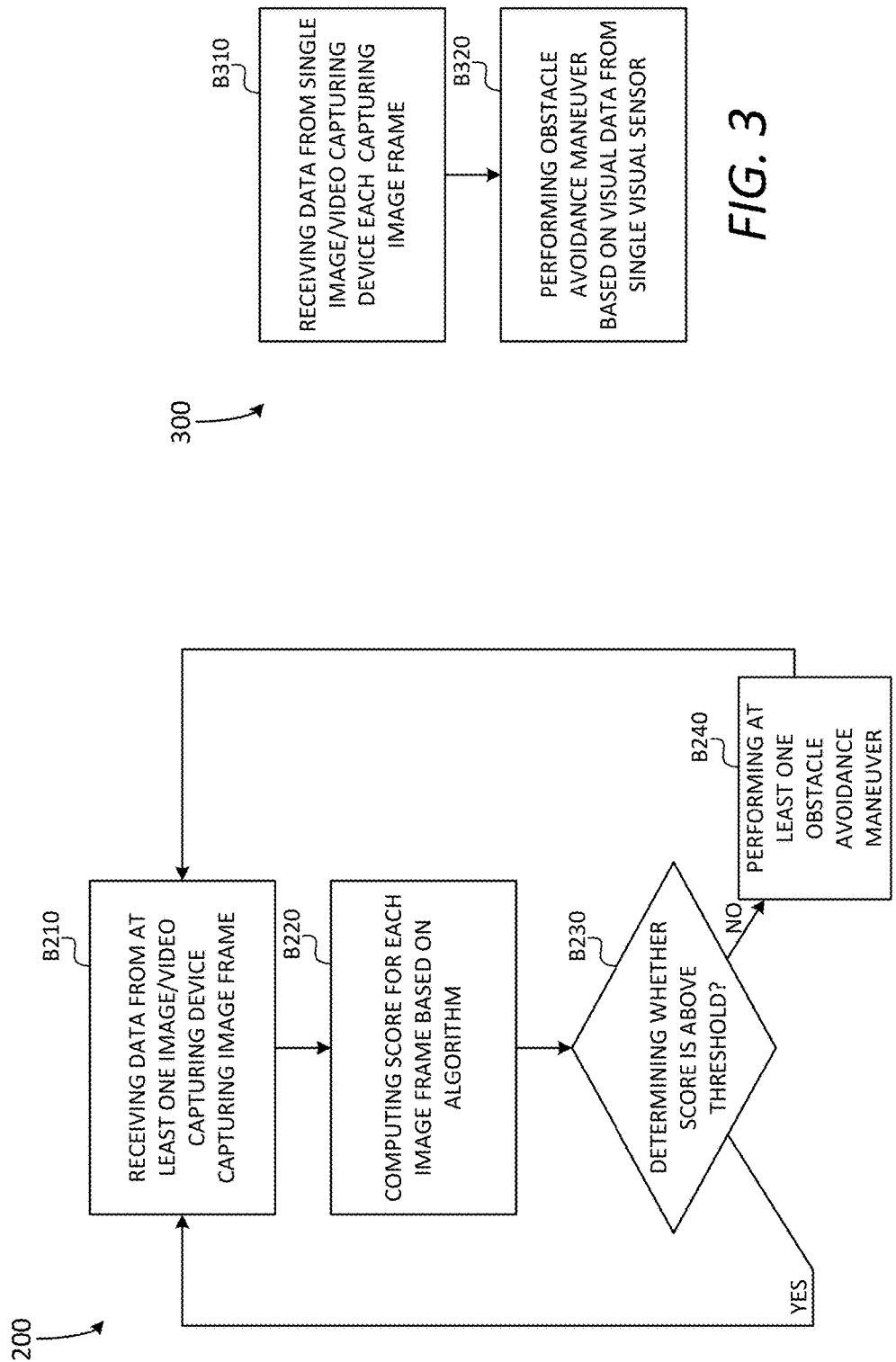

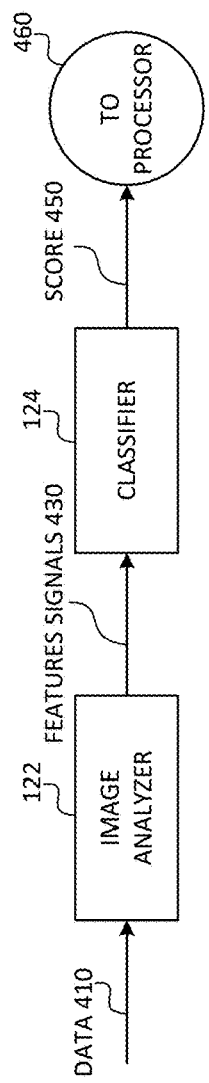
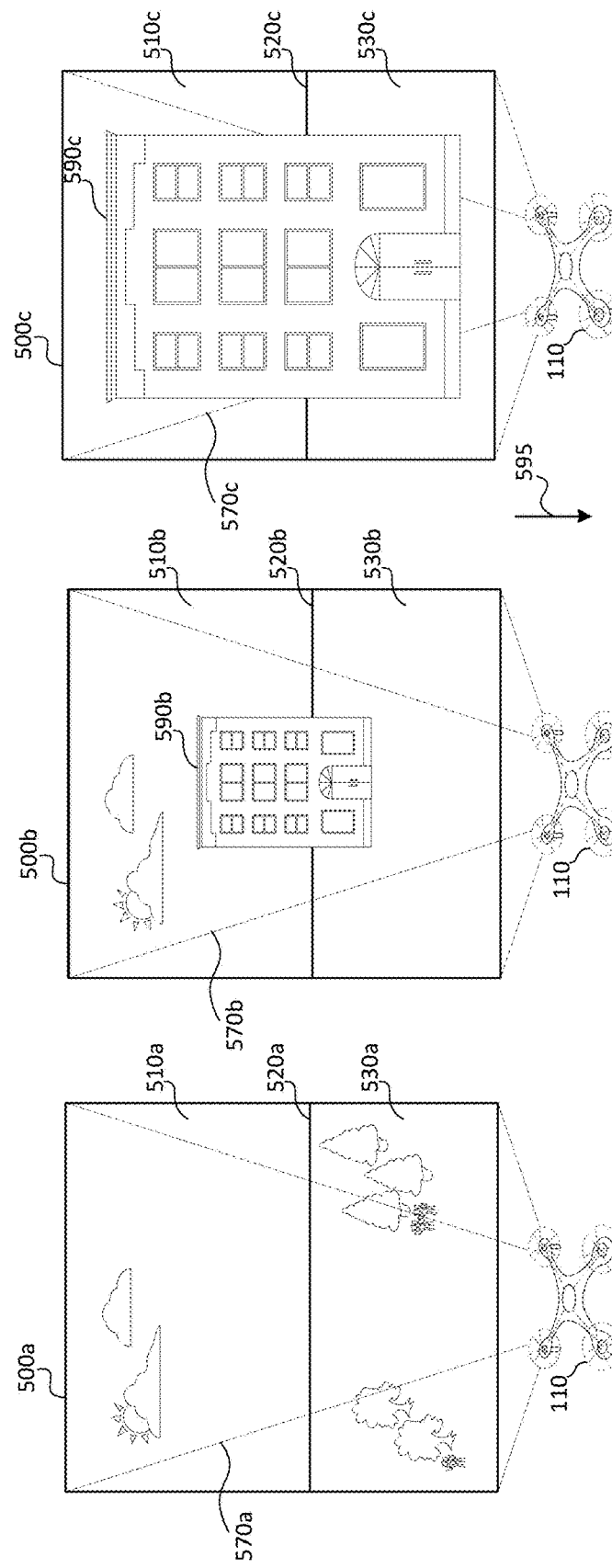

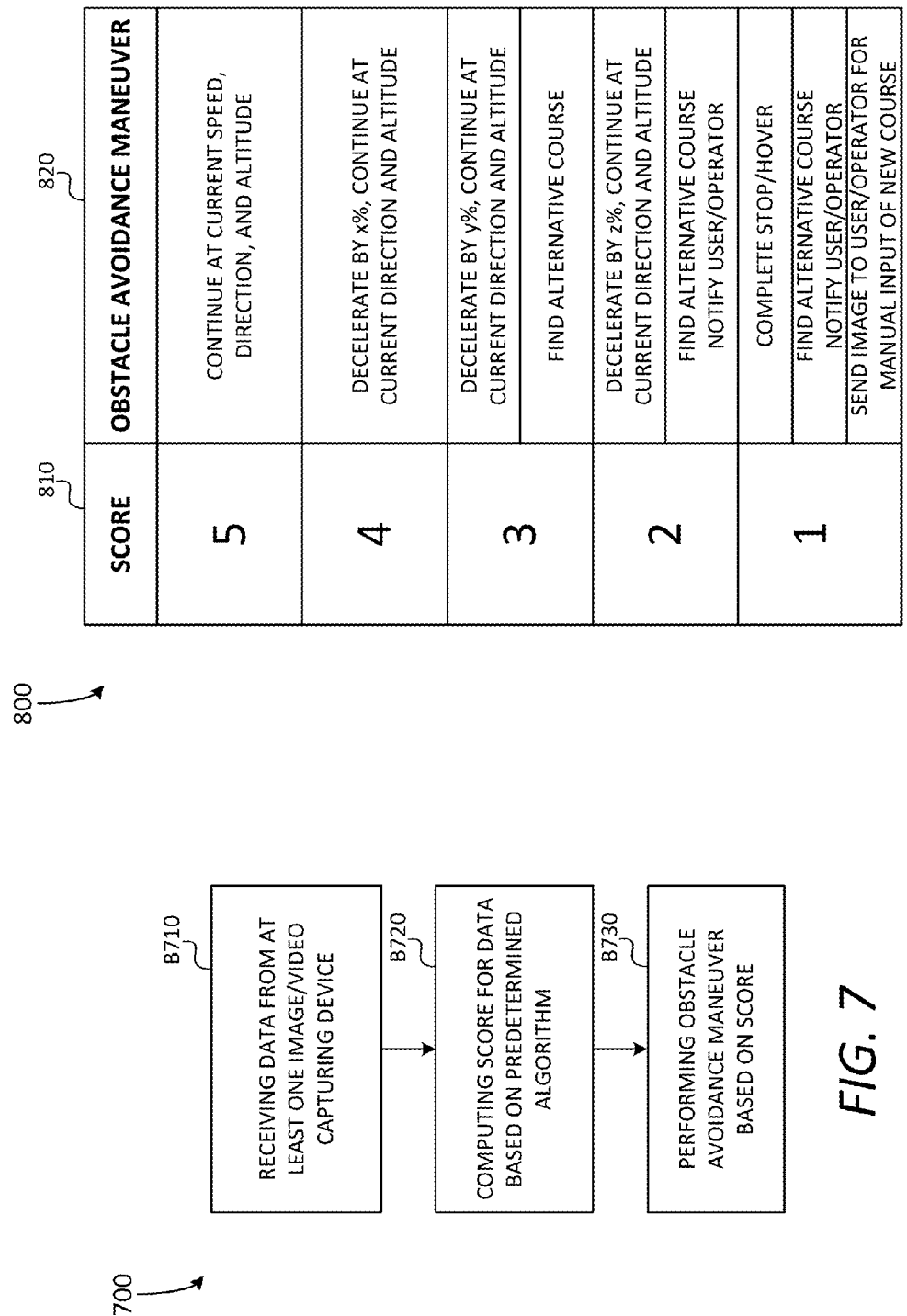

UNMANNED AERIAL VEHICLE OBSTACLE DETECTION AND AVOIDANCE

CROSS-REFERENCE TO RELATED PATENT APPLICATIONS

This application claims priority from U.S. Provisional Application No. 62/217,685 filed Sep. 11, 2015, incorporated herein by reference in its entirety.

BACKGROUND

A variety of Unmanned Aerial Vehicles (UAVs) have been developed, including Remote Control (RC) planes for the hobbyists, and more advanced "drones" or UAVs for military and commercial applications. Various UAV configurations and features, including for example, "quadcopter" or four-rotor configurations, have been developed for hobby, commercial or military applications.

Flight paths and flight altitudes of the UAVs may vary, depending upon the configuration, capability, environment of use and intended function of the UAV. Accordingly, UAVs can encounter various different obstacles that could pose a collision risk during flight. Obstacles sensing and avoidance can be implemented for autonomous and semi-autonomous UAVs. Particularly, obstacles sensing may refer to identifying and/or ascertaining the obstacles in the path of the UAV. Avoidance may refer to determining an evasive action, such as, but not limited to a new flight path for the UAV to maneuver around (or up/under) or otherwise avoid the identified obstacle.

Obstacle detection and avoidance technologies can include one or more of sonar, radar, computer vision (such as depth measuring using stereo cameras, depth-sensing cameras, structure from motion techniques, or the like), and the like. A robust detection and avoidance system may include multiple techniques. However, a system with multiple sensors and sensing technologies can add significant weight to a UAV, thus hindering speed, agility, and load-carrying capabilities of the UAV. Cost of the obstacle detection and avoidance system may increase as the number and complexity of the sensing technologies increase.

Additionally, given that obstacle detection and avoidance algorithms may be executed on the UAV itself, obstacle detection and avoidance methods that are computationally intensive and complex may require relatively high consumption of power and lengthy execution times.

SUMMARY

Embodiments relate to obstacle detection and avoidance apparatuses and methods as implemented on an Unmanned Aerial Vehicle (UAV). Data of an image frame corresponding to a current direction of motion captured by an image/video capturing device (e.g., a camera) of the UAV may be classified. A score corresponding to distance and size of an obstacle may be determined for the data. In response to the score crosses a threshold, the UAV may assume high confidence level to continue flying safely along the same path. Otherwise, the UAV may take avoidance measures. In some embodiments, machine (deep) learning may be implemented for classification of the data and outputting the score.

In some embodiments, a support vector machine and/or a deep convolutional network may be implemented. In various embodiments, a single image/video capturing device (e.g., a single camera) can suffice for obstacle detection and avoidance described in the embodiments, instead of multiple or more complicated sensors (that are used for, for instance, depth sensing). Therefore, embodiments described herein may be less complex, less costly, more time-efficient, more energy-efficient, and lighter.

In some embodiments, a method for detecting an obstacle in a path of an UAV includes receiving data corresponding to an image frame from a single image/video capturing device of the UAV, computing a score based on the data, and performing at least one obstacle avoidance maneuver based on the score.

In some embodiments, the at least one obstacle avoidance maneuver comprises one or more of changing a speed of the UAV, changing the direction associated with the path, changing an altitude of the UAV, adjusting pitch of the UAV, adjusting yaw of the UAV, adjusting roll of the UAV, finding an alternative course, notifying the user/operator, landing, returning to base, coming to a complete halt or hovering in place, transmitting the data to the operator, requesting the operator's guidance, or switching to manual operation by the operator.

In some embodiments, the image/video capturing device is a camera.

In some embodiments, the data includes at least one of an image or a sampled video.

In some embodiments, the score corresponds to a confidence level of safe flight as the UAV continues in the path.

In some embodiments, the score is computed based on machine learning.

In some embodiments, performing the at least one obstacle avoidance maneuver based on the score further includes continuing to fly along the path based on the score.

In some embodiments, computing the score based on the data includes extracting at least one feature from the data and computing the score for the data based on the at least one feature.

In some embodiments, the at least one feature is extracted based on clutter on a horizon in the data.

In some embodiments, the at least one feature is extracted with a deep convolution network. The score is computed by a support vector machine.

In some embodiments, the method further includes receiving a trigger for computing a score, and computing the score for a portion of the image frame of the data based on the trigger.

In some embodiments, the trigger is in response to detecting the UAV is turning in a first direction or initiating computing to find an alternative course in the first direction. The portion of the image frame corresponds to the first direction.

In some embodiments, the method further includes receiving a trigger for computing a new score, rotating the image/video capturing device based on the trigger, and computing the new score based on new data obtained from rotating the image/video capturing device.

In some embodiments, the trigger is in response to at least one of detecting the UAV is turning in a first direction or initiating computing to find an alternative course corresponding to turning the UAV in the first direction.

In some embodiments, the method further includes receiving a trigger for computing a new score, activating the at least one additional image/video capturing device, and computing the new score for the new data based on new data obtained from at least one additional image/video capturing device.

In some embodiments, the trigger is at least one of detecting the UAV is turning in a first direction or initiating computing to find an alternative course corresponding to turning the UAV in a first direction.

In some embodiments, the image/video capturing device captures a field of view in a direction of motion of the UAV.

In some embodiments, the method further includes activating at least one of a stereo camera, sonar, radar, computer vision sensor, additional camera, infrared camera, or moisture sensor based on the score.

According to various embodiments, an apparatus for detecting an obstacle in a path of an UAV includes a single image/video capturing device and a processor coupled to the single image/video capturing device, the processor configured to: receive data corresponding to an image frame from the single image/video capturing device of the UAV, compute a score based on the data, and perform at least one obstacle avoidance maneuver based on the score.

In some embodiments, an apparatus for detecting an obstacle in a path of an UAV, the apparatus includes means for receiving data from a single image/video capturing device of the UAV, means for computing a score based on the data, and means for performing at least one obstacle avoidance maneuver based on the score.

In some embodiments, a non-transitory computer-readable medium for storing computer-readable code, such that, when executed, causes a processor to perform a method for detecting an obstacle in a path of an UAV including receiving data corresponding to an image frame from the single image/video capturing device of the UAV, computing a score based on the data, and performing at least one obstacle avoidance maneuver based on the score.

In some embodiments, the at least one obstacle avoidance maneuver comprises one or more of changing a speed of the UAV, changing the direction associated with the path, changing an altitude of the UAV, adjusting pitch of the UAV, adjusting yaw of the UAV, adjusting roll of the UAV, finding an alternative course, notifying the user/operator, landing, returning to base, coming to a complete halt or hovering in place, transmitting the data to the operator, requesting the operator's guidance, or switching to manual operation by the operator.

In some embodiments, the image/video capturing device is a camera.

In some embodiments, the data comprises at least one of an image or a sampled video.

In some embodiments, the score corresponds to a confidence level of safe flight as the UAV continues in the path.

BRIEF DESCRIPTION OF THE DRAWINGS

The accompanying drawings, which are incorporated herein and constitute part of this specification, illustrate exemplary embodiments of the disclosure, and together with the general description given above and the detailed description given below, serve to explain the features of the various embodiments.

FIG. 2 is a process flow diagram illustrating an example of an obstacle detection and avoidance method according to various embodiments.

FIG. 3 is a process flow diagram illustrating an example of an obstacle detection and avoidance method according to various embodiments.

FIG. 4 is a diagram illustrating an example of a workflow executed by the detection and avoidance module according to various embodiments.

FIG. 5A is a diagram illustrating an example of a first image received by the detection and avoidance module according to some embodiments.

FIG. 5B is a diagram illustrating an example of a second image received by the detection and avoidance module according to some embodiments.

FIG. 5C is a diagram illustrating an example of a third image received by the detection and avoidance module according to some embodiments.

FIG. 7 is a process flow diagram illustrating an example of an obstacle detection and avoidance method according to various embodiments.

FIG. 8 is a table illustrating a non-limiting example of relationships between the score and one or more particular obstacle avoidance maneuvers, according to some embodiments.

DETAILED DESCRIPTION

Various embodiments will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the disclosure or the claims.

Subject matter described herein relates to flight-path obstacle detection and avoidance apparatuses and processes for Unmanned Aerial Vehicles (UAVs), and UAVs that include such apparatuses and processes.

Figure 1A:
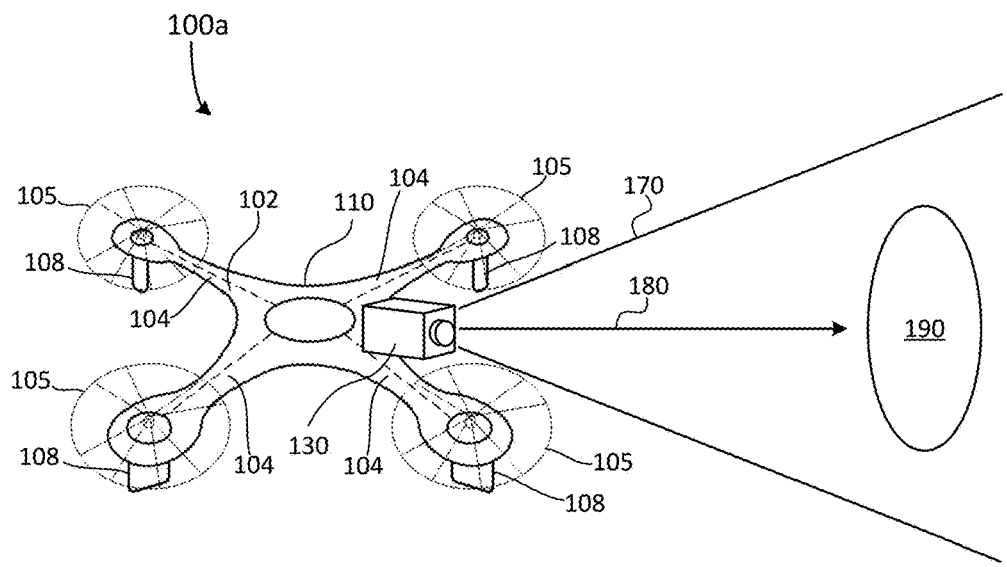
FIG. 1A is a schematic diagram illustrating an example of an interaction between an UAV and an obstacle according to various embodiments.

FIG. 1A is a schematic diagram 100a illustrating an example of an interaction between a UAV 110 and an obstacle 190 according to various embodiments. Referring to FIG. 1A, the UAV 110 may include at least one arm extending from a main body. For example, the UAV 110 may include a main body 102 and a plurality of extended portions or "arms" 104 that extend from the main body 102. Each of the arms 104 may have a first end that is attached to the main body 102 and a second end (e.g., a free end) supporting a propeller 105 and associated propeller motor. Although some embodiments include four arms 104 extending from the main body 102 (and associated propellers 105), in other embodiments, UAVs may include any suitable number of arms (and associated propellers 105). For example, further embodiments may include or employ a UAV having one arm, two arms, three arms, or more than four arms (and a corresponding number of propellers 105). Other embodiments may include or employ a UAV having no arms, for example, that is configured as a helicopter-style UAV, or other configurations having one or more propellers at its main body 102.

The main body 102 and the arms 104 of the UAV 110 may be made of any suitable materials, including, but not limited to, plastic, metal, wood, ceramic, composite material, or combinations thereof. In particular embodiments, at least a portion of (or the entire) structure of one or more (or each) of the arms 104 may be composed of a circuit board material or substrate, on which one or more electrically conductive traces or other electrical circuit components may be formed. In further embodiments, at least a portion of the main body 102 is composed of a circuit board material or substrate. In various embodiments, the traces may be used for, for example, but not limited to, transmitting power and/or control signals from a power source and/or motor controller to motors for propellers 105, or electronic speed controllers coupled to the motors for propellers 105 of the UAV 100.

In some embodiments, the UAV 110 may include propellers 105 and associated propeller motors secured to each arm 104, at or near the second end of each arm 104, to provide flight, aerial propulsion and maneuvering capability to the UAV 110. In some embodiments, the propellers 105 may be located on top of the arms 104, at or near the second ends of the arms 104. In other embodiments, the propellers 105 may be provided at other suitable locations, such as, but not limited to, below the arms 104, at end surfaces of the arms 104, or within openings in the arms 104. In addition, the UAV 110 may have a plurality of legs 108, including a leg 108 at the bottom of each arm 104 or at other suitable locations. The legs 108 may support the UAV 110 in an upright or standing orientation (an orientation from which the UAV 110 may lift off under the power of the propellers 105), as the UAV 110 is on the ground and not in flight. Each propeller 105 may be coupled to a respective propeller motor configured to drive and spin the propellers 105 at speeds sufficient for the UAV 110 to achieve aerial propulsion. For example, the propeller motors may include, but not be limited to, Alternating Current (AC) electric motors, Direct Current (DC) electric motors, brushless motors, brushed motors, or any other suitable motor for use in UAV 110 for achieving aerial propulsion.

Although the UAV 110 includes propellers 105, other embodiments may employ other suitable aerial propulsion systems including, but not limited to, a ducted fan system, a jet engine system, and/or the like. Although some embodiments of the UAV 110 have a multi-arm configuration, other embodiments may include or operate with other UAV configurations, such as, but not limited to, helicopter-style UAVs, airplane-style UAVs (e.g., fixed-winged UAVs), zeppelin or blimp-style UAVs, and/or other multicopter-style UAVs. While some embodiments are described herein with reference to UAVs, other embodiments may include or employ other types of aerial vehicles, including manned vehicles. In addition, some embodiments of UAVs may be capable of travel by land and/or water instead of, or in addition to, aerial travel The UAV 110 may include an image/video capturing device 130 for capturing optical or visual data for a field of view 170. The optical or visual data may include images taken at a time interval (for example, every 0.2 s, 0.1 s, 0.05 s, 0.025 s, or the like). The optical or visual data may additionally or alternatively include videos captured and sampled (as separate images) at 5 Hz, 10 Hz, 20 Hz, 40 Hz, or the like. The image/video capturing device 130 may face in a first direction 180 (oriented to sense optical or visual data in the first direction 180). The first direction 180 may correspond to a current direction of motion of the UAV 110. In other words, the image/video capturing device 130 may face a forward direction in which the UAV 110 is currently moving.

The obstacle 190 may be an object in a flight path of the UAV 110. The flight path may correspond with the first direction 180. In some embodiments, the obstacle 190 may refer to an object with which the UAV 110 may possibly collide, if the UAV 110 continues to move in the first direction 180. The obstacle 190 may be located in the first direction 180 relative to the UAV 110, and be at or extend to a sufficient elevation or altitude to present a risk of collision for the UAV 110. In some embodiments, the obstacle 190 may be sufficiently elevated as a portion of the obstacle 190 extends a sufficient (defined) distance above a horizon appearing on the data (images or videos) captured by the image/video capturing device 130 on the UAV 110. The obstacle 190 may include man-made objects or structures such as, but not limited to, a building, wall, fence, airplane, helicopter, another UAV, pole, tower, power transmission line, or the like. The obstacle 190 may include natural objects such as, but not limited to, a tree, mountain, hill, avian animal, or the like.

Figure 1B:
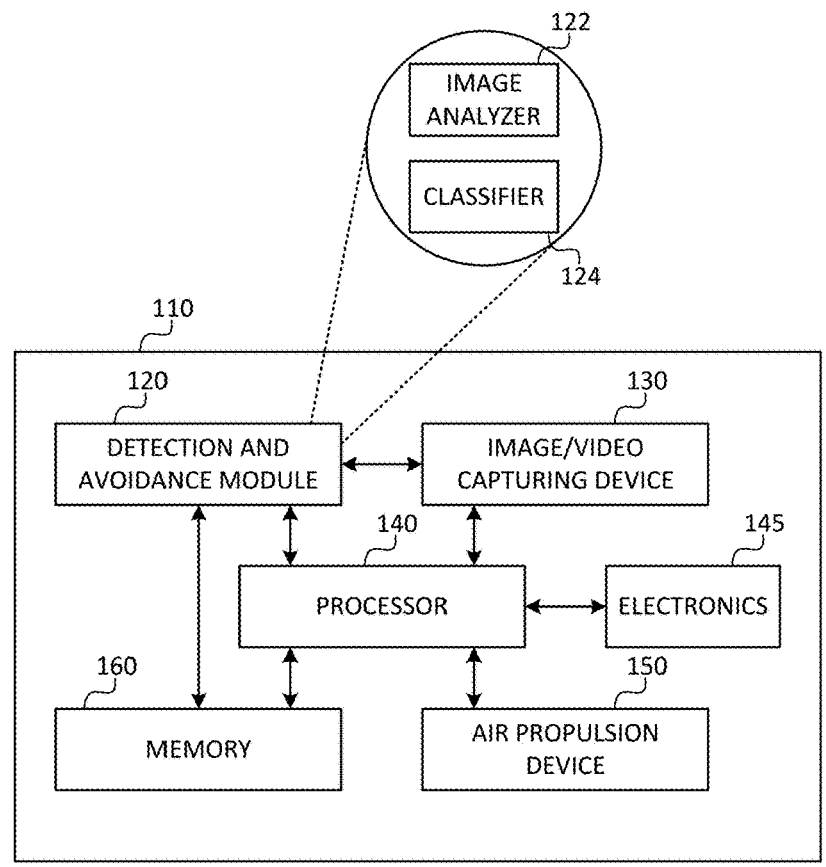
FIG. 1B is a block diagram illustrating an example of an UAV having obstacle detection and avoidance capabilities according to various embodiments.

Embodiments described herein may be implemented for various types of UAVs having flying and flight control capabilities. FIG. 1B is a block diagram illustrating an example of the UAV 110 (FIG. 1A) having an obstacle detection and avoidance system and capabilities according to various embodiments. Referring to FIGS. 1A-1B, the UAV 110 may include a detection and avoidance module 120, the image/video capturing device 130, a processor 140, electronics 145, at least one air propulsion device 150, and memory 160.

In some embodiments, the UAV 110 may include a single optical or image/video capturing device (e.g., the image/video capturing device 130). The image/video capturing device 130 may include a single camera capturing a 2-dimensional data (image data or video data) of the field of view 170 in the first direction 180. According to some embodiments, the data is captured by a single camera (image/video capturing device 130) and is used to compute a score, as (or soon after) the data is captured or sampled. Based on the score, the UAV 110 may (or may not) be controlled to take avoidance maneuvers.

In comparison with obstacle detection systems using multiple sensors (e.g., stereo cameras for depth perception, sonars, radars, computer vision sensors, and the like), single-sensor obstacle detection may reduce weight, complexity, and cost of the UAV 110. Embodiments can provide robust flight-path obstacle detection, while minimizing cost and weight, enabling an UAV to be commercially-feasible and capable of carrying payloads or sensors for other purposes. In further embodiments, the image/video capturing device 130 may be used for other purposes, including providing images or streaming images/videos, for example, as a visual feed to a user, for reconnaissance, for live broadcasting, or the like. In such embodiments, the same camera (or existing camera) used for visual feed of images or streaming video to a user, can be used as the image/video capturing device 130 for providing obstacle detection capabilities to reduce hardware cost.

In such embodiments, the image/video capturing device 130 may serve at least two purposes, including obstacle detection and one or more other image or video capturing purposes unrelated to obstacle detection. This configuration can further reduce cost and weight of the UAV 110. In other embodiments, the UAV 110 may include two or more image/video capturing devices 130 (including one or more that is dedicated for use in an obstacle detection and avoidance system, and one or more for use in capturing images or video for other purposes unrelated to obstacle detection).

The memory 160 and the processor 140 may operate with each other to store and run software related to flight control, obstacle detection (as the detection and avoidance module 120), or other functions of the UAV 110. For example, the processor 140 may process software and/or data stored on the memory 160, where such software may control the processor and other components of the UAV 110 to perform operations, including operations described herein.

According to some embodiments, the memory 160 may be a non-transitory processor-readable storage medium that stores processor-executable instructions. The memory 160 may include any suitable internal or external device for storing software and data. Examples of the memory 160 may include, but are not limited to, Random Access Memory (RAM), Read-Only Memory (ROM), floppy disks, hard disks, dongles, or other Recomp Sensor Board (RSB) connected memory devices, or the like. The memory 160 may store an operating system (OS), user application software, and/or executable instructions. The memory 160 may store application data, such as, but not limited to, an array data structure.

According to some embodiments, the processor 140 may be a general-purpose processor. The processor 140 may include any suitable data processing device, such as, but not limited to, a microprocessor, Graphics Processor Unit (GPU), or custom hardware. In the alternative, the general-purpose processor 140 may be any suitable electronic processor, controller, microcontroller, or state machine. The general-purpose processor 140 may be implemented as a combination of computing devices (e.g., a combination of a Digital Signal Processor (DSP) and a microprocessor, a plurality of microprocessors, at least one microprocessor in conjunction with a DSP core, or any other suitable configuration). The sampling rate of the images or the videos may be predetermined based on processor speed of the processor 140.

The electronics 145 may include additional electronics or modules for performing various functions and operations of the UAV 110. For example, the electronics may include a Global Positioning System (GPS), network device for communicating with the operator of the UAV 110 remotely, flight control modules, and the like. In some embodiments, the electronics 145 may further include additional sensors such as, but not limited to, a camera, sonar, radar, infrared camera, moisture sensor, and the like. In embodiments in which the image/video capturing device 130 includes a single image/video capturing device or camera, additional sensors may not be included as the single image/video capturing device 130 may be capable of detecting the obstacles 190 by itself, thus reducing weight, power consumption, and complexity. However, other embodiments may include additional sensor(s) for obstacle detection. The electronics 145 may be coupled to the processor 140 and/or the memory 160, and is configured for performing its respective functions.

The at least one air propulsion device 150 may include, but not limited to, one or more propellers (e.g. the propellers 105) and motors. The air propulsion device 150 may be configured to provide aerial propulsion to the UAV 110 such that the UAV 110 is capable of flight and maneuvering during flight.

The detection and avoidance module 120 may be used to implement functions described with respect to obstacle detection and obstacle avoidance according to various embodiments. The detection and avoidance module 120 may include an image analyzer 122 and a classifier 124. The detection and avoidance module 120 (e.g., the image analyzer 122) may be connected to the image/video capturing device 130 for receiving the optical or visual data captured by the image/video capturing device 130. The image analyzer 122 may take the optical or visual data signals as received from the image/video capturing device 130 and output signals indicating features (e.g., feature vectors, or the like) extracted from the data. The classifier 124 may output the score, based, at least in part, on the features indicated in the output signals from the image analyzer 122. The score may be used to determine one or more obstacle avoidance maneuver (e.g., speed adjustment, elevation adjustment, course adjustment, and/or the like.

Each of the detection and avoidance module 120, image analyzer 122, and classifier 124 may be implemented with the processor 140 and the memory 160 to perform their respective functions as described. Alternatively, one or more or all of the detection and avoidance module 120, image analyzer 122, and classifier 124 may include at least one separate processor (having capabilities such as, but not limited to, described with respect to the processor 140) and/or memory (having capabilities such as, but not limited to, described with respect to the memory 160) for performing their respective functions.

FIG. 2 is a process flow diagram illustrating an example of an obstacle detection and avoidance method 200 according to various embodiments. Referring to FIGS. 1A-2, the obstacle detection and avoidance method 200 may be performed, for example, by the detection and avoidance module 120 and/or the processor 140 according to various embodiments. At block B210, the detection and avoidance module 120 (e.g., the image analyzer 122) may receive the data from at least one image/video capturing device (e.g., the image/video capturing device 130) capturing at least one image/video frame. Each of the at least one image/video capturing device may have a field of view such as, but not limited to, the field of view 170. The image analyzer 122 may output signals indicating features extracted from the data.

At block B220, the detection and avoidance module 120 (e.g., the classifier 124) may compute the score for each image frame based on an algorithm. The classifier 124 may compute the score from the features determined by the image analyzer 122. The algorithm may include horizon-based object (clutter) identification. In further embodiments, the algorithm may be implemented with machine learning or deep learning.

The score may represent a confidence level related to whether the current path ahead of the UAV 110 (in the first direction 180) is clear. In some embodiments, a higher score on a scale may indicate higher confidence level that the path ahead is clear. In other embodiments, a lower score on the scale may indicate higher confidence level that the path ahead is clear. At block B230, the detection and avoidance module 120 may determine whether the score crosses a threshold.

In response to determining that the score is above the threshold (e.g., indicating that the confidence of a clear path is high) (B230:YES), the UAV 110 may continue along its current path (in the first direction 180) and restart the process at block B210. On the other hand, in response to determining that the score is not above the threshold (e.g., indicating that the confidence of a clear path is low) (B230:YES), the UAV 110 may perform at least one obstacle avoidance maneuver, at block B240.

Additionally or alternatively, in response to determining that the score is above the threshold (e.g., indicating that the confidence of a clear path is low in alternative embodiments), the UAV 110 may perform the at least one obstacle avoidance maneuver. In response to determining that the score is not above the threshold (e.g., indicating that the confidence of a clear path is high in the alternative embodiments), the UAV 110 may continue along its current path (in the first direction 180) and restart the process at block B210.

In some embodiments in which the detection and avoidance module 120 is implemented with the processor 140, the processor 140 may control the air propulsion device 150 and/or the electronics 145 to perform the at least one obstacle avoidance maneuver. In some embodiments in which the detection and avoidance module 120 has at least one separate processor, the detection and avoidance module 120 may send the score to the processor 140. The processor 140 may control the air propulsion device 150 and/or the electronics 145 to perform the at least one obstacle avoidance maneuver based on the score. In alternative embodiments, the detection and avoidance module 120 itself may be coupled to and control the air propulsion device 150 and/or the electronics 145 to perform the at least one obstacle avoidance maneuver as described.

FIG. 3 is a process flow diagram illustrating an example of an obstacle detection and avoidance method 300 according to various embodiments. Referring to FIGS. 1A-3, the obstacle detection and avoidance method 300 may be performed, for example, by the detection and avoidance module 120 and/or the processor 140 according to various embodiments. At block B310, the detection and avoidance module 120 (e.g., the image analyzer 122) may receive the data from the single image/video capturing device 130 capturing the image frame.

At block B320, the detection and avoidance module 120 and/or the processor 140 may perform the at least one obstacle avoidance maneuver based on the data from the single image/video capturing device 130. As described, the image analyzer 122 may output signals indicating features extracted from the data. The classifier 124 may determine a score based on the features and some algorithm. The score may be used to control which obstacle avoidance maneuver to perform (or to simply continue in the current direction, speed, altitude, and course).

FIG. 4 is a diagram illustrating an example of a workflow executed by the detection and avoidance module 120 and/or the processor 140 according to various embodiments. Referring to FIGS. 1A-4, data 410 may include image data or sampled video data originating from the image/video capturing device 130. The image analyzer 122 may use the data 410 as input. The image analyzer 122 may output feature signals 430 indicating features. The features signals 430 may include attributes associated with at least one object extracted from that data 410. In particular embodiments, the attributes may include a perceived dimension of the extracted object as it appears in the image or the sampled video data, determined based on the algorithm.

The classifier 124 may take the features signals 430 as input and output a score 450 as output signals. In particular, the score 450 may be based on the attributes associated with the object(s) extracted from the data 410. In some embodiments, the score 450 may reflect the confidence level of proceeding in the same speed, direction, and altitude in light of the attributes of the extracted object (having at least a portion of which crossing the horizon). Objects crossing the horizon in the data 410 may be "cluttering" the horizon.

The score 450 may be used by the processor 140 (and/or the detection and avoidance module 120) to control the air propulsion device 150 and/or the electronics 145, as shown in block B460.

FIG. 5A is a diagram illustrating an example of a first image 500a received by the detection and avoidance module 120 (FIG. 1B) as the data 410 (FIG. 4) according to some embodiments. FIG. 5B is a diagram illustrating an example of a second image 500b received by the detection and avoidance module 120 as the data 410 according to some embodiments. FIG. 5C is a diagram illustrating an example of a third image 500c received by the detection and avoidance module 120 as the data 410 according to some embodiments.

Referring to FIGS. 1-5C, the algorithm to determine features of the image or sampled video may include detecting the horizon, determining whether there is at least one object cluttering the horizon, and determining attributes (e.g., size, dimensions, and length of extension in a bottom direction) of the at least one object cluttering the horizon (when found).

In some embodiments, the horizon may be identified (by the processor 140 or the detection avoidance module 120) by comparing color and/or shading of a top portion (e.g., sky) of the image frame with color and/or shading of a bottom portion (e.g., ground or water) of the image frame. A slim boundary or line separating the top portion with the bottom portion in terms of color and/or shading may be the horizon. In other embodiments, the horizon may be detected via any other suitable mechanisms. The horizon may be in a generally middle portion with respect to the image frame separating a top portion of the image frame and the bottom portion of the image frame.

In some embodiments, objects cluttering the horizon may be determined by first identifying objects in the image frame based on shading and contours. An identified object that crosses the horizon may be cluttering the horizon. Each object cluttering the horizon may have a first part in the top portion while having a second part in the bottom portion of the image frame.

In some embodiments, the size, dimensions, or other attributes of the object and/or a length by which the object extensions in a bottom direction in the image frame may be measured, by the image analyzer 122 and outputted as features (features signals 430). In further embodiments, the image analyzer 122 may determine a percentage of the size (or length of extension in the bottom direction) of the object cluttering the horizon with respect to an area of the entire image frame. The larger the measured dimensions or the percentage, the more unsafe it is for the UAV 110 to proceed in the current course (e.g., the first direction 180).

The first image 500a may be captured by the UAV 110 (via the image/video capturing device 130) in a first field of view 570a. The first field of view 570a may be a forward field of view corresponding to the current motion of the UAV 110 such as, but not limited to, the field of view 170. The first image 500a may include an upper portion 510a representing the sky and a lower portion 530a representing the ground. A horizon 520a may separate the upper portion 510a and the lower portion 530a. In the first image 500a, the horizon 520a is clear and not blocked (cluttered) by any object. In some embodiments, the algorithm may dictate that when no object crosses the horizon 520a (i.e., a first part of an object being in the upper portion 510a and a second part of the object being in the lower portion 530a simultaneously), the current flight path (in the first direction 180) is clear. The first image 500a may refer to the highest confidence level of safe flight (with very low possibility of collision, if any) in proceeding in the current direction (the first direction 180), speed, and altitude.

The second image 500b may be captured by the UAV 110 (via the image/video capturing device 130) in a second field of view 570b. The second field of view 570b may be a forward field of view corresponding to the current motion of the UAV 110 of view, such as, but not limited to, the field of view 170. The second image 500b may include an upper portion 510b representing the sky and a lower portion 530b representing the ground. A horizon 520b may separate the upper portion 510b and the lower portion 530b. In the second image 500b, the horizon 520b may be blocked partially by an object 590b. In some embodiments, the algorithm may determine that in response to the object 590b crossing (cluttering) the horizon 520b (i.e., a first part of the object 590b being in the upper portion 510b and a second part of the object 590b being in the lower portion 530b simultaneously), the confidence level may depend on the dimension of the object 590b. In some embodiments, the larger the object 590b is, the lower the confidence level for safe flight (as reflected by the score 450) is. Generally, the larger the object 590b appears on the second image 500b, the closer the object 590b may be. In further embodiments, the more the object 590b extends in a bottom direction 595 in the bottom portion 530b, the lower the confidence level for safe flight is.

Thus, in particular embodiments, the features of the features signals 430 may include the dimensions of the object 590b, the length by which the object 590b extends in the bottom direction 595, and the like. Given that the object 590b is of a medium size and extends a modest amount in the bottom direction 595, an intermediate confidence level and corresponding score 450 may be determined by the classifier 124 for the second image 500b. This may refer to a medium confidence level of safe flight (i.e., some possibility of collision) in proceeding in the current direction, speed, altitude, and/or course. This score, for instance, may be lower than the score of the first image 500a.

The third image 500c may be captured by the UAV 110 (via the image/video capturing device 130) in a third field of view 570c. The third field of view 570c may be a forward field of view corresponding to the current motion of the UAV 110, such as, but not limited to, the field of view 170. The third image 500c may include an upper portion 510c representing the sky and a lower portion 530c representing the ground. A horizon 520c may separate the upper portion 510c and the lower portion 530c. In the third image 500c, the horizon 520c is blocked (cluttered) by an object 590c. In some embodiments, the algorithm may dictate that in response to the object 590c crossing the horizon 520c (i.e., a first part of the object 590c being in the upper portion 510c and a second part of the object 590c being in the lower portion 530c simultaneously), the confidence level may depend on the dimension and/or a length of extension in the bottom direction 595 of the object 590c as described.

The dimensions of the object 590c, the length by which the object 590c extends in the bottom direction 595, and the like may be the features of the features signals 430 (attributes). Given that the object 590c is of a larger size and extends a large amount in the bottom direction 595, a low confidence level and corresponding score 450 may be determined by the classifier 124 (as compared to the second image 500b). This may refer to a low confidence level of safe flight (with greater possibility of collision) in proceeding in the current direction, speed, and altitude.

In some embodiments in which a high confidence level of safe flight may be associated with a high score, the first image 500a may be assigned the highest score (among the three images 500a, 500b, and 500c) by the classifier 124. The second image 500b may be assigned a medium score (among the three images 500a, 500b, and 500c) by the classifier 124. The third image 500c may be assigned the lowest score (among the three images 500a, 500b, and 500c) by the classifier 124.

In alternative embodiments in which a high confidence level of safe flight may be associated with a low score, the first image 500a may be assigned the lowest score (among the three images 500a, 500b, and 500c) by the classifier 124. The second image 500b may be assigned a medium score (among the three images 500a, 500b, and 500c) by the classifier 124. The third image 500c may be assigned the highest score (among the three images 500a, 500b, and 500c) by the classifier 124.

Figure 6A:
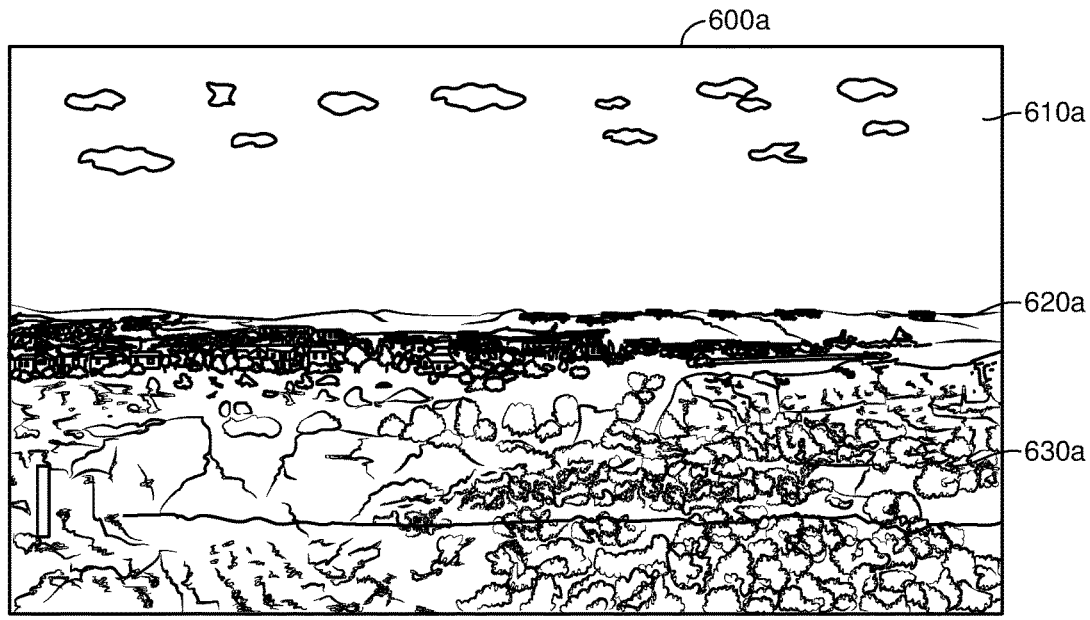
FIG. 6A is an example of a display according to various embodiments.

FIG. 6A is an example of an image frame 600a according to various embodiments. Referring to FIGS. 1A-6A, the display screen 600a may correspond to the data 410 captured by the image/video capturing device 130 according to the field of view 170. The image frame 600a may include a top portion 610a showing the sky. The image frame 600a may further include a bottom portion 630a showing the ground. The image frame 600a may include a horizon 620a separating the top portion 610a and the bottom portion 630b. In the image frame 600a, no close objects are shown as crossing the horizon 620a. Thus, similar to described with respect to the first image 500a, a relatively high confidence level for continued fighting the current direction, speed, and altitude (as indicated by a corresponding score 450) may be assigned by the classifier 124.

Figure 6B:
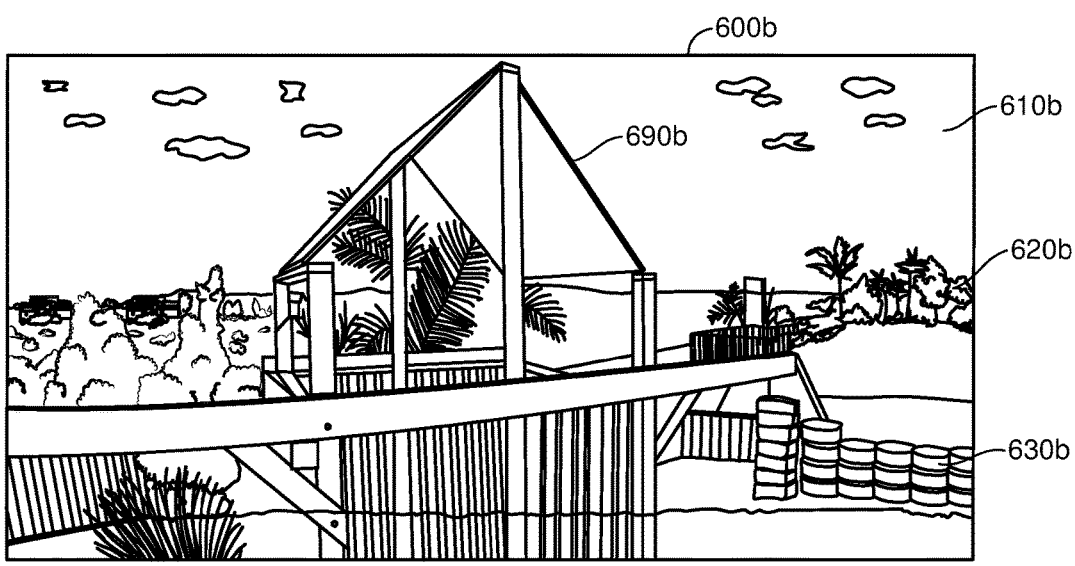
FIG. 6B is an example of a display according to various embodiments.

FIG. 6B is an example of an image frame 600b according to various embodiments. Referring to FIGS. 1A-6B, the display screen 600b may be another sample of the data 410 captured by the image/video capturing device 130 according to the field of view 170. The image frame 600b may include a top portion 610b showing the sky. The image frame 600b may further include a bottom portion 630b showing the ground. The image frame 600a may include a horizon 620b separating the top portion 610b and the bottom portion 630b. A structure 690b may be determined by the image analyzer 122 to be crossing the horizon 620b. The structure 690b may appear to be large in the image frame 600b and extends significantly in a bottom direction (corresponding to the ground). Thus, similar to described with respect to the third image 500c, a relatively low confidence level for continued fighting the current direction, speed, and altitude (as indicated by a corresponding score 450) may be assigned by the classifier 124.

In some embodiments, the data 410 corresponding to the displays 600a and 600b may be used not only for obstacle detection, but also other uses such as user-enabled video recording or imaging. In other words, the displays 600a and 600b may be a part of the user feed of image or video data provided to the user (e.g., to allow the user to see and/or record visual information captured by the image/video capturing device 130). This allows embodiments described herein to employ an image/video capturing device or camera (e.g., the image/video capturing device 130) already existing (or provided on) the UAV 110 for other purposes, to minimize cost, weight, and complexity.

In some embodiments, the deep learning or machine learning algorithms may be implemented for the algorithm. In embodiments in which the data 410 from the single image/video capturing device 130 is used to perform obstacle detection, deep learning or machine learning algorithms may be used to "train" the detection and avoidance module 120 to recognize (1) whether the flight path is clear, and (2) with what level of confidence is the path clear. The flight path may refer to continued flight in the current direction (e.g., the first direction 180), speed, and altitude. A deep learning network may be used. The program corresponding to the machine-learned responses may be stored in the memory 160.

In a non-limiting example, the image analyzer 122 may be implemented with a deep convolution network or the like. The deep convolution network may be a neural network that identifies patterns of an image based on user-inputted human responses to test cases. The trained deep convolution network may accept images (e.g., the data 410) as input and output a feature vector (e.g., the features signals 430) as a machine-trained response.

In a non-limiting example, the classifier 124 may be implemented with a support vector machine or the like. The support vector machine may have an ability to analyze and recognize patterns of the input data and compute a corresponding classification. For instance, the support vector machine may accept feature vectors outputted by the deep convulsion network and output the score 450, based on user-inputted human responses in test cases.

In machine-learning embodiments, an operator may input a response for each test image to train the detection and avoidance module 120 (e.g., the image analyzer 122 and/or the classifier 124) how to output the appropriate score 450 corresponding to each test image. In further embodiments, even after the detection and avoidance module 120 has been programmed and in actual use, machine learning may continue, as operators of the UAV 110 may provide input as to whether the classifier 124 has outputted the appropriate score 450. The score 450 may be displayed on a user feed (such as, but not limited to, on the displays 600a and 600b) for the operator's reference. The operator may select to rectify the score 450. The rectified score may be transmitted to the UAV 110 (e.g., via wireless signals). In such embodiments, the UAV 110 may have network devices having transmitters, receivers, and/or transceivers for receiving such signals. The program in the memory 160 may accordingly be updated.

FIG. 7 is a process flow diagram illustrating an example of an obstacle detection and avoidance method 700 according to various embodiments. Referring to FIGS. 1A-7, the obstacle detection and avoidance method 700 may be performed by the detection and avoidance module 120 and/or the processor 140 according to various embodiments. At block B710, the detection and avoidance module 120 (e.g., the image analyzer 122) or the processor 140 may receive the data 410 from the image/video capturing device 130.

At block B720, the detection and avoidance module 120 (e.g., the classifier 124) and/or the processor 140 may compute the score 450 for the data 410 based on the algorithm. At block B730, the detection and avoidance module 120 and/or the processor 140 may perform a type of obstacles avoidance maneuver based on the score 450. The types of the obstacles avoidance maneuvers may include, but not limited to, changing speed of the UAV 110, changing directions, changing altitude, adjusting pitch, yaw, roll, finding an alternative course, notifying the user/operator, landing, returning to base, coming to a complete halt or hovering in place, transmitting the data 410 wirelessly requesting operator guidance (or otherwise switching to manual operation by an operator), and the like.

FIG. 8 is a table 800 illustrating a non-limiting example of relationships between a score (e.g., the score 450 in FIG. 4) and one or more particular obstacle avoidance maneuvers, according to some embodiments. According to the table 800, a higher score (shown in the score column 810) may indicate a higher confidence level of safe flight continuing in the current direction (e.g., the first direction 180), speed, and altitude. However, any suitable relationship between the confidence level and the score 450 may be implemented consistent with the spirit of the embodiments described.

In some embodiments, in response to the score 450 being 5 (highest confidence level), the UAV 110 may be configured to continue along the same course. As shown in an obstacle avoidance maneuver column 820, the UAV 110 may be configured (by the processor 140 and/or the detection and avoidance module 120) to perform a first action. In this example, the first action may include continuing at a current speed, direction, altitude, and course as the score 450 is 5.

In response to the score 450 being 4 (second-highest confidence level on the scale as the obstacle 190 may be closer than if the score is 5), the UAV 110 may be configured (by the processor 140 and/or the detection and avoidance module 120) to perform a second action (e.g., a first type of obstacle avoidance maneuver). For example, the second action may include continuing at the current direction and altitude, but decelerating the current speed by a first amount (x %). In some embodiments, x may be (but not limited to) 20, 30, or 40. Other second actions may be performed in addition or alternatively. For example, the second action could include sampling data at a higher rate or otherwise performing the methods (e.g., 200, 700, etc.) more frequently.

In response to the score 450 being 3 (medium confidence level on the scale as the obstacle 190 may be even closer than if the score is 4 or 5), the UAV 110 may be configured (by the processor 140 and/or the detection and avoidance module 120) to perform a third action (e.g., a second type of obstacle avoidance maneuver). For example, the third action may include continuing at the current direction and altitude, but decelerating the current speed by a second amount (y %), where the second amount may be larger than the first amount. In some embodiments, y may be (but not limited to) 45, 50, or 60. The UAV 110 may be configured (by the processor 140 and/or the detection and avoidance module 120) to find an alternative course. The alternative course may be based on the score 450 or a different score using a portion of the image frame captured, turning (pivoting) the image/video capturing device 130, or enabling additional (secondary) image/video capturing devices (or other sensors). Other third actions may be performed in addition or alternatively. For example, the third action could include sampling data at a higher rate or otherwise performing the methods (e.g., 200, 700, etc.) more frequently than if the score is 4 or 5.

In response to the score 450 being 2 (second-lowest confidence level on the scale as the obstacle 190 may be even closer than if the score is 3, 4, or 5), the UAV 110 may be configured (by the processor 140 and/or the detection and avoidance module 120) to perform a fourth action (e.g., a third type of obstacle avoidance maneuver). For example, the fourth action may include continuing at the current direction and altitude, but decelerating the current speed by a third amount (z %). The third amount may be larger than the first and second amounts. In some embodiments, z may be (but not limited to) 70, 80, or 90. The UAV 110 may be configured (by the processor 140 and/or the detection and avoidance module 120) to find an alternative course. The UAV 110 may be configured (by the processor 140 and/or the detection and avoidance module 120) to notify the user/operator of the UAV 110. For example, the network device (part of the electronics 145) may be configured by the processor 140 and/or the detection and avoidance module 120 to send to the operator (controlling or otherwise monitoring the UAV 110) a Short Message Service (SMS) text, an email, a graphical indication on a video feed (e.g., the displays 600a and 600b), or the like. Other fourth actions may be performed in addition or alternatively. For example, the fourth action could include sampling data at a higher rate or otherwise performing the methods (e.g., 200, 700, etc.) more frequently than if the score is 3, 4, or 5.

In response to the score 450 being 1 (lowest confidence level on the scale as the obstacle 190 may be closer than if the score is 2, 3, 4, or 5), the UAV 110 may be configured (by the processor 140 and/or the detection and avoidance module 120) to perform a fifth action (e.g., a fourth type of obstacle avoidance maneuver). For example, the fifth action may include coming to a complete stop and/or to hover in a current position (no forward motion). The UAV 110 may be configured (by the processor 140 and/or the detection and avoidance module 120) to find an alternative course, notify the user/operator of the UAV 110. The UAV 110 may be configured (by the processor 140 and/or the detection and avoidance module 120) to send the data 410 to the user/operator requesting manual input of a new course. For example, the network device (part of the electronics 145) may be configured by the processor 140 to send to the operator the data 410 (in some embodiments, in the video feed such as, but not limited to, the displays 600a and 600b). The operator may assume wireless command of the UAV 110 or input the new course remotely. Other fifth actions may be performed in addition or alternatively. For example, the fifth action could include sampling data at a higher rate or otherwise performing the methods (e.g., 200, 700, etc.) more frequently than if the score is 2, 3, 4, or 5.

It should be clear that the above example having a scale from 1 to 5 (with corresponding actions that re different from one another) is non-limiting. Other scales may be implemented in other embodiments.

In some embodiments, the processor 140 and/or the detection and avoidance module 120 may control a speed of rotation of the at least one air propulsion device 150 to control the speed of the UAV 110. Particularly, processor 140 and/or the detection and avoidance module 120 may reduce the gain of some or all of the one or more air propulsion devices 150 to reduce throttle, based on the score 450. For example, a score of 4 may correspond to a 20% reduction in speed, while a score of 3 may correspond to a 40% reduction in speed.

In some embodiments, the processor 140 and/or the detection and avoidance module 120 may control pitch, roll, and/or yaw of the UAV 110 (or otherwise changing course of the UAV 110) based on the score 450. For example, a score of 4 may correspond to banking five degrees away from the obstacle (e.g., 190), while a score of 3 may correspond to banking 10 degrees away from the obstacle.

In various embodiments, after an avoidance maneuver is made that changes the course of the UAV 110, the processor 140 and/or the detection and avoidance module 120 may configure the UAV 110 (by controlling the gains of the one or more air propulsion devices 150) based on a new direction of the new course.

Figure 9:
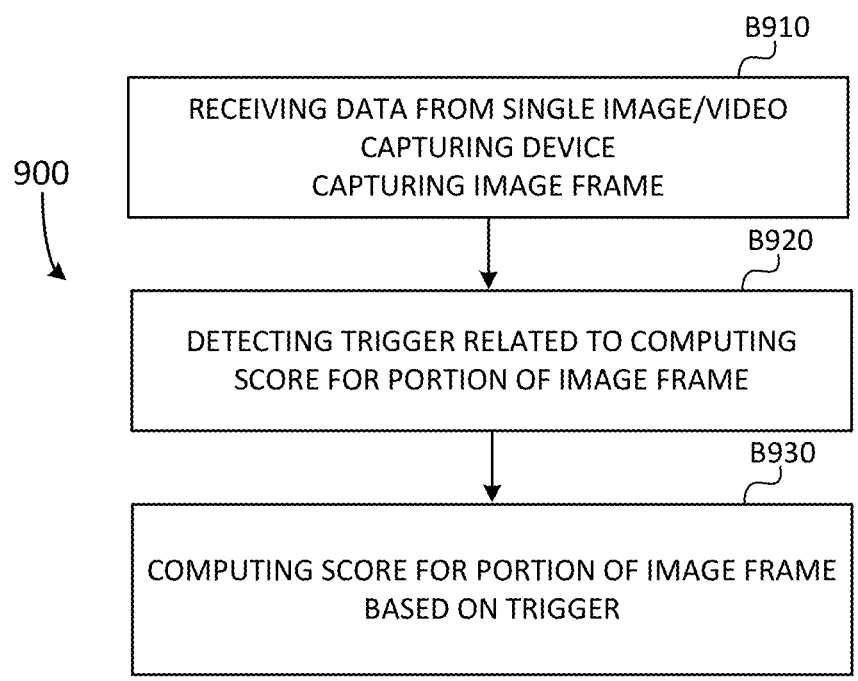
FIG. 9 is a process flow diagram illustrating an example of an obstacle detection and avoidance method based on score for a portion of an image frame according to various embodiments.

FIG. 9 is a process flow diagram illustrating an example of an obstacle detection and avoidance method 900 based on a score for a portion of the image frame according to various embodiments. Referring to FIGS. 1A-9, the obstacle detection and avoidance method 900 may be performed by the detection and avoidance module 120 and/or the processor 140 according to various embodiments. At block B910, the detection and avoidance module 120 (e.g., the image analyzer 122) or the processor 140 may receive the data 410 from the single image/video capturing device 130 capturing the image frame in the manner described.

At block B920, the detection and avoidance module 120 and/or the processor 140 may detect a trigger related to computing a score for a portion of the image frame. In some embodiments, the trigger may be detecting the UAV 110 is being controlled (by the operator) to turn in a direction. In further embodiments, the trigger may be initiating computing to find an alternative course (as the obstacle avoidance maneuver) in a designated direction (e.g., a deviation from the first direction 180).

At block B930, the detection and avoidance module 120 and/or the processor 140 may compute a score for a portion of the image frame based on the trigger. For example, in response to detecting the trigger, such as detecting that the UAV 110 is being controlled to turn left or computing is initiated to find an alternative course to the left of the first direction 180, the score may be computed for a left portion of the image frame (instead of the entire image frame). Similarly, in response to detecting the trigger, such as detecting that the UAV 110 is being controlled to turn right (up, or down) or computing is initiated to find the alternative course to the right (up, or down) of the first direction 180, the score may be computed for a right (up, or down) portion of the image frame (instead of the entire image frame).

Figure 10C:
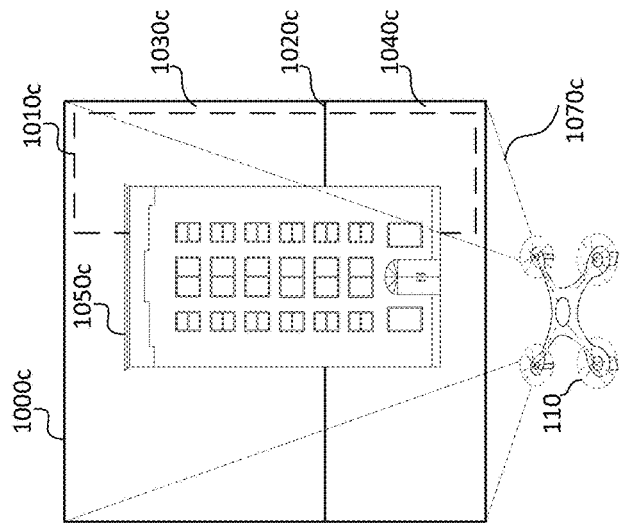
FIG. 10C is a diagram illustrating an example of a third image received by the detection and avoidance module (e.g., by the image analyzer) according to some embodiments.
Figure 10B:
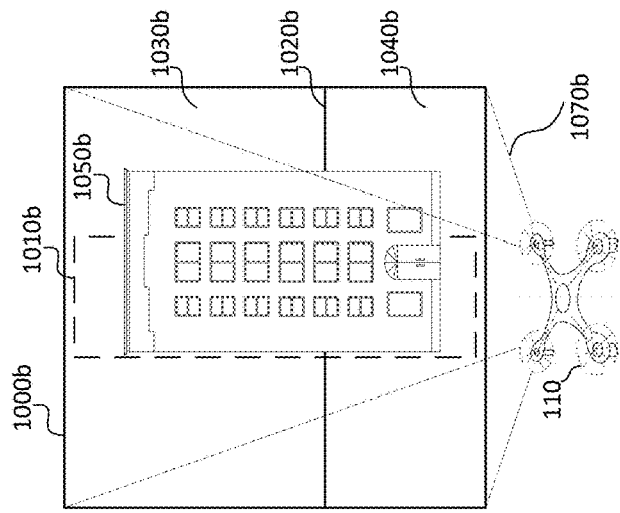
FIG. 10B is a diagram illustrating an example of a second image received by the detection and avoidance module (e.g., by the image analyzer) for computing a score according to some embodiments.
Figure 10A:
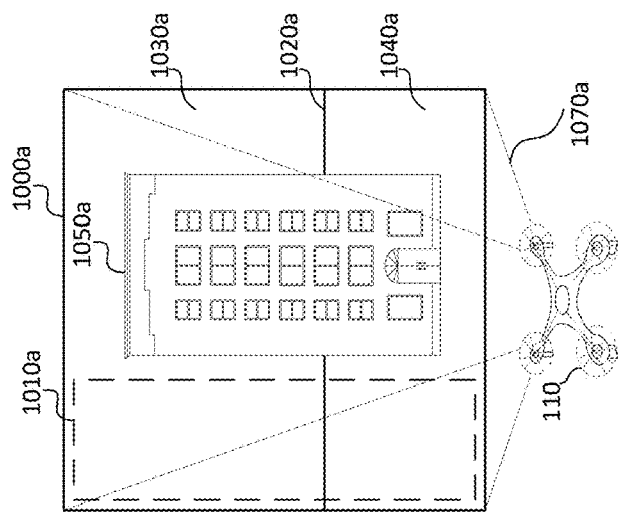
FIG. 10A is a diagram illustrating an example of a first image received by the detection and avoidance module (e.g., by the image analyzer) for computing a score according to some embodiments.

FIG. 10A is a diagram illustrating an example of a first image 1000a received by the detection and avoidance module 120 (FIG. 1B) (e.g., the image analyzer 122) or the processor 140 (FIG. 1B) as the data 410 (FIG. 4) for computing a score according to some embodiments. FIG. 10B is a diagram illustrating an example of a second image 1000b received by the detection and avoidance module 120 (FIG. 1B) (e.g., the image analyzer 122) or the processor 140 (FIG. 1B) as the data 410 (FIG. 4) for computing a score according to some embodiments. FIG. 10C is a diagram illustrating an example of a third image 1000c received by the detection and avoidance module 120 (FIG. 1B) (e.g., the image analyzer 122) or the processor 140 (FIG. 1B) as the data 410 (FIG. 4) according to some embodiments.

The first image 1000a may be captured by the UAV 110 (via the image/video capturing device 130) in a first field of view 1070a. The first field of view 1070a may be a field of view such as, but not limited to, the field of view 170. The first image 1000a may include an upper portion 1030a representing the sky and a lower portion 1040a representing the ground. A horizon 1020a may separate the upper portion 1030a and the lower portion 1040a. In the first image 1000a, the horizon 1020a may be cluttered by an object 1050a.

In response to the trigger, which may be turning left of the first direction 180 or finding an alternative course to the left of the first direction 180, the detection and avoidance module 120 and/or the processor 140 may compute the partial score in a similar manner as described herein with respect to the score 450, but for a left portion 1010*a* instead of the entire first image 1000*a*. Particularly, the left portion 1010*a* does not include any object that clusters the horizon 1020*a*. The object 1050*a* is outside of the left portion 1010*a*, despite having a tremendous size with respect to the first image 1000*a*. Thus, the score for the left portion 1010*a* may correspond to a high confidence level of safe flight associated with the left turn.

The second image 1000*b* may be captured by the UAV 110 (via the image/video capturing device 130) in a second field of view 1070*b*. The first field of view 1070*a* may correspond to the second field of view 1070*b*. The first image 1000*a* may correspond to the second image 1000*b*. The second image 1000*b* may include an upper portion 1030*b* (corresponding to the upper portion 1030*a*) representing the sky and a lower portion 1040*b* (corresponding to the lower portion 1030*b*) representing the ground. A horizon 1020*b* (corresponding to the horizon 1020*a*) may separate the upper portion 1030*b* and the lower portion 1040*b*. In the second image 1000*b*, the horizon 1020*b* may likewise be cluttered by the object 1050*b* (corresponding to the object 1050*a*).

In response to the trigger, which may be continuing in the first direction 180 (no actual direction change or finding an alternative course involving a direction change), the detection and avoidance module 120 may compute the score in a similar manner as described herein with respect to the score 450, but for a center portion 1010*b* instead of the entire second image 1000*b*. Particularly, the center portion 1010*b* may include the object 1050*b*, which clutters the horizon 1020*b* and appears relatively large. Thus, the score for the center portion 1010*b* may indicate a relatively low confidence level of safe flight associated with the current course.

The third image 1000*c* may be captured by the UAV 110 (via the image/video capturing device 130) in a third field of view 1070*c*. The first and second fields of view 1070*a* and 1070*b* may correspond to the third field of view 1070*c*. The first and second images 1000*a* and 1000*b* may correspond to the third image 1000*c*. The third image 1000*c* may include an upper portion 1030*c* (corresponding to the upper portions 1030*a* and 1030*b*) representing the sky and a lower portion 1040*c* (corresponding to the lower portions 1030*a* and 1030*b*) representing the ground. A horizon 1020*c* (corresponding to the horizons 1020*a* and 1020*b*) may separate the upper portion 1030*c* and the lower portion 1040*c*. In the third image 1000*c*, the horizon 1020*c* may likewise be cluttered by the object 1050*c* (corresponding to the objects 1050*a* and 1050*b*).

In response to the trigger, which may be turning right (with respect to the first direction 180) or finding an alternative course in the right (with respect to the first direction 180), the detection and avoidance module 120 and/or the processor 140 may compute the score in a similar manner as described herein with respect to the score 450, but for a right portion 1010*c* instead of the entire third image 1000*c*. Particularly, the right portion 1010*c* may include at least a portion of the object 1050*c* that clusters the horizon 1020*c*. Thus, the score for the right portion 1010*c* may indicate a medium confidence level of safe flight associated with the right turn.

As shown in images 1000*a*-1000*c*, the entire image (e.g., the first image 1000*a*, the second image 1000*b*, and the third image 1000*c*) may be segmented into three strips (the left portion 1010*a*, the middle portion 1010*b*, and the right portion 1010*c*). A corresponding strip (portion) may be used to determine the score based on the direction associated with actual turning of the UAV 110 or finding the alternative course as an obstacle avoidance maneuver. In other embodiments, the image (the data 410) may be segmented into two portions or four or more portions for computing a score for each thereof. Vertical portions (shown in FIGS. 10A-10C), horizontal portions, square or rectangular portions, or other suitable sectioning techniques may be used.

In other words, the position of the portion may correspond to a direction of actual turn of the UAV 110 or finding an alternative course. Illustrating with a non-limiting example, in response to the image being segmented into 5 vertical strips, turning the UAV 110 X° left may correspond to computing the score for the strip that is between a left-most strip and a center strip. Turning the UAV 110 2X° left may correspond to computing the score for the left-most strip.

Additionally or alternatively, the image may be sectioned based on the direction of the actual turn of the UAV 110 and/or the alternative course for which computing has initiated. Illustrating with a non-limiting example, the image may be segmented into two portions in response to the UAV 110 turning or an alternative course being computed X° right (the right portion may be used to determine the score). The image may be segmented into three portions in response to the UAV 110 turning or an alternative course being computed 2X° right (the right-most portion may be used to determine the score). The image may be segmented into four portions in response to the UAV 110 turning or an alternative course being computed 3X° right (the right-most portion may be used to determine the score), vice versa.

In addition or alternative to computing the score in response to a turn or an alternative course, the UAV 110 may be configured to adjust angle of the image/video capturing device 130 and/or enable additional image/video capturing devices to compute a new score corresponding to actual turning or an alternative course of the UAV 110.

Figure 11B:
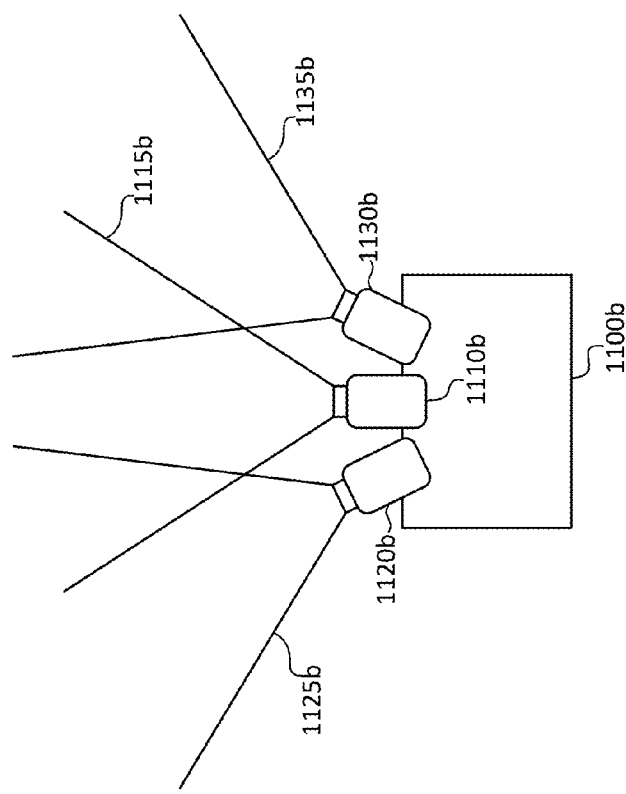
FIG. 11B is a diagram illustrating an example of a multi-sensor configuration according to various embodiments.
Figure 11A:
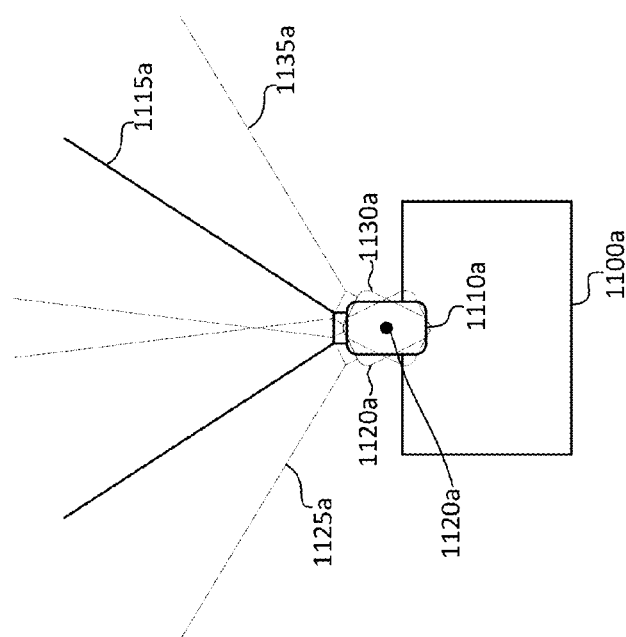
FIG. 11A is diagram illustrating an example a sensor-turning configuration according to various embodiments.

FIG. 11A is diagram illustrating an example of a top view of a UAV 1100*a* having a sensor-turning configuration according to various embodiments. Referring to FIGS. 1-11A, the UAV 1100*a* may be a vehicle such as, but not limited to, the UAV 110. The UAV 1100*a* may include a single image/video capturing device 1110*a* for implementing the obstacle detection and avoidance as described herein. In particular, the image/video capturing device 1110*a* may correspond to the image/video capturing device 130, but can pivot/turn. The image/video capturing device 1110*a* may be in an initial position having a first field of view 1115*a*.

In some embodiments, the image/video capturing device 1110*a* may be mounted on a rotatable mount, such as, but not limited to a gimbal 1120*a*. The image/video capturing device 1110*a* may be configured to rotate with respect to an axis of rotation provided by the gimbal for capturing other fields of view. Particularly, the image/video capturing device 1110*a* may be configured to turn to at least second position 1120*a* to capture the data 410 in a second field of view 1125*a*. Likewise, the image/video capturing device 1110*a* may be configured to turn to a third position 1130*a* to capture the data 410 in a third field of view 1135*a*. Each of the second and third positions 1120*a* and 1130*a* (as well as any additional orientations) may correspond to a new direction. The score 450 may be determined in the manner described for the second and third fields of view 1125*a* and 1135*a*. The amount that the image/video capturing device 1110*a* turns may be based on the actual turn or the alternative course of the UAV 1110*a*. For example, in response to the UAV 1110*a* turning or finding an alternative course Y° to a direction, the image/video capturing device 1110*a* may turn Y° in the same direction.

FIG. 11B is a diagram illustrating an example of a top view of a UAV 1100*b* having a multi-sensor configuration according to various embodiments. Referring to FIGS. 1-11B, the UAV 1100*b* may be a vehicle such as, but not limited to, the UAV 110. The UAV 1100*b* may include a first image/video capturing device 1110*b* having a first field of view 1115*b*. The UAV 1100*b* may include a second image/video capturing device 1120*b* having a second field of view 1125*b*. The UAV 1100*b* may include a third image/video capturing device 1130*b* having a second field of view 1135*b*. The first field of view 1115*b* may correspond to a forward direction (e.g., the first direction 180) with respect to the motion of the UAV 1100*b*. The second field of view 1125*b* may correspond to a left-turning direction with respect to the current motion of the UAV 1100*b*. The third field of view 1135*b* may correspond to a right-turning direction with respect to the current motion of the UAV 1100*b*.

In some embodiments, the first image/video capturing device 1110*b* may always be functional to capture the data 410 in the first direction 180 for computing the score 450. In response to detecting a turn or finding an alternative course corresponding to a turn, one or more of the second or third image/video capturing device 1120*b* or 1130*b* may be activated to capture additional data. A new score may be computed based on the additional data. Additional sensors such as, but not limited to, stereo cameras, sonars, radars, computer vision sensors, additional camera, infrared camera, moisture sensor, and the like may be activated for computing confidence level of safe flight associated with a turn or finding an alternative course, enabling additional accuracy. The additional sensors may be activated based on the score.

Figure 12:
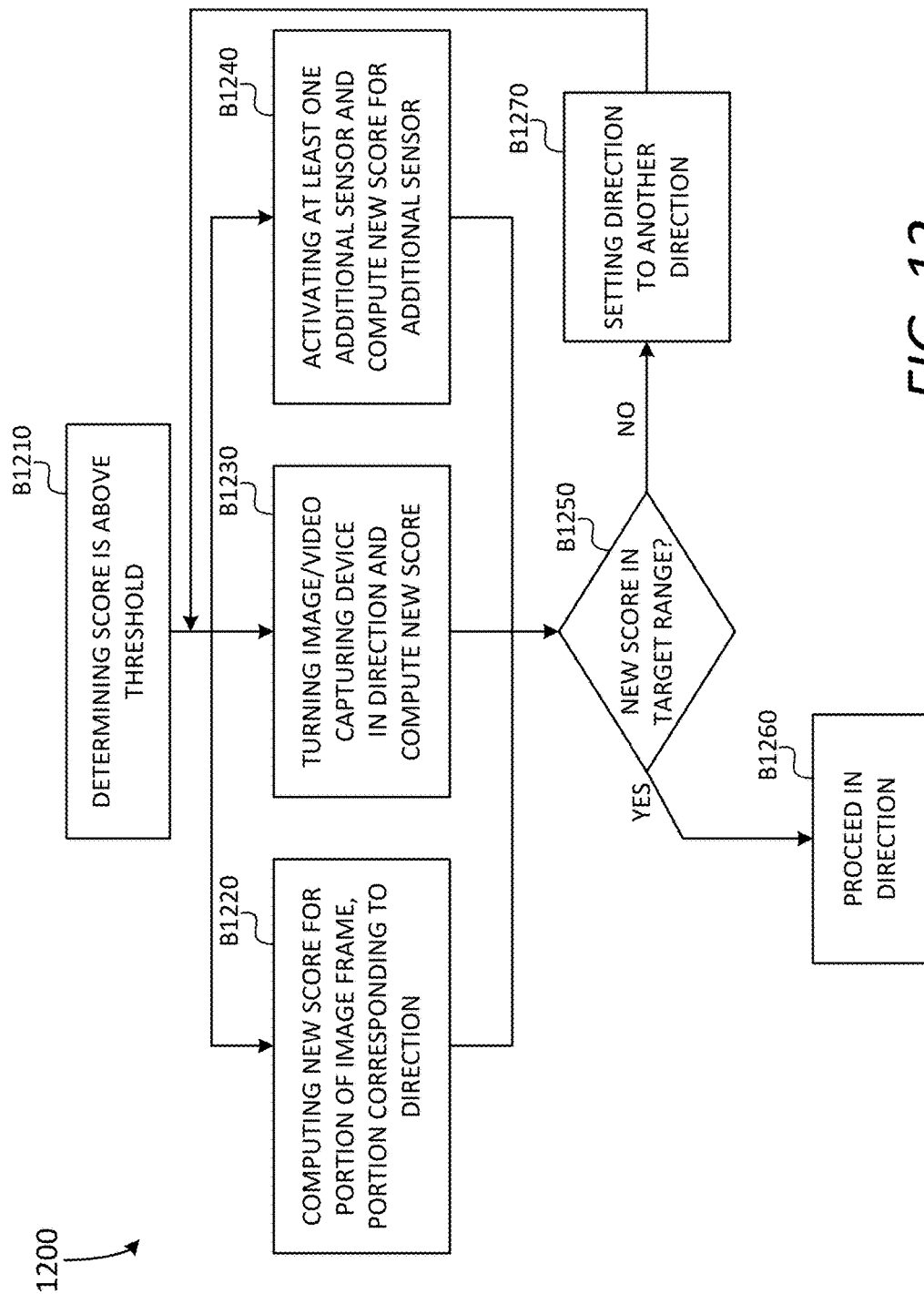
FIG. 12 is a process flow diagram illustrating an example of an obstacle detection and avoidance method according to various embodiments.

FIG. 12 is a process flow diagram illustrating an example of an obstacle detection and avoidance method 1200 according to various embodiments. Referring to FIGS. 1A-12, the obstacle detection and avoidance method 1200 may be performed by the detection and avoidance module 120 and/or the processor 140 according to various embodiments. At block B1210, the detection and avoidance module 120 and/or the processor 140 may determine that a current score (e.g., the score 450 determined according described) associated with the data 410 originating from the single image/video capturing device 130 is above a threshold. In some embodiments, the threshold may indicate low confidence level of safe light in the current course (e.g., in the first direction 180). In other words, the detection and avoidance module 120 and/or the processor 140 may determine high probability of collision with the obstacle 190.

The detection and avoidance module 120 and/or the processor 140 may take one or more actions described with respect to block B1220-B1240, depending on features of the UAV 110, 1100*a*, or 1100*b*. For example, at block B1220, the detection and avoidance module 120 and/or the processor 140 may compute the score for a portion of the image frame associated with the image/video capturing device 130 as the image/video capturing device 130 includes a single immovable image/video capturing device. The portion may correspond to the direction of the alternative course in the manner described.

For instance, at block B1230, the detection and avoidance module 120 and/or the processor 140 may turn the image/video capturing device 130 (as the image/video capturing device 130 is configured as the movable image/video capturing device 1110*a*) in the direction and compute the new score associated with the new field of view.

Additionally or alternatively, at block B1240, the detection and avoidance module 120 may activate at least one additional image/video capturing device (e.g., the image/video capturing device 1120*b* or 1130*b* arranged to face different directions as compared to the first direction 180) and compute the new score associated with the at least one additional image/video capturing device.

At block B1250, the detection and avoidance module 120 and/or the processor 140 may determine whether the new/score is within a target range. The target range many be defined by a threshold indicating acceptable confidence level of safe flight associated with the direction.

In response to the new score being within the target range (B1250:YES), the UAV 110 (or 1100*a*, 1100*b*) may be configured by the detection and avoidance module 120 or the processor to proceed in the new direction, at block B1260. On the other hand, the new/score not being within the target range may indicate that the direction may not be safe. The detection and avoidance module 120 and/or the processor 140 may set the direction to another direction at block B1270 (B1250:NO) and reiterate the process at one or more of blocks B1220-B1240.

The direction may be set based on an algorithm. For example, in response to the first direction 180 being unclear (as indicated by the score with respect to the threshold at block B1210), the direction may be an amount (e.g., Z°) left, right, above, below (or a combination thereof) with respect to the current first direction 180. In response to such direction is determined to be unclear (as indicated by the new score not being in the target rage, B1250:NO), the direction may be set to another direction (e.g., 2Z° in the same direction (left) or switch to another direction (right) and start at Z°).

In some embodiments, after proceeding in the new/partial direction at block B1260 for a period of time (e.g., 30 s, 60 s, 300 s, or the like), the UAV 110 (or 1100*a*, 1100*b*) may be configured to turn back to its original path.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

What is claimed is:

1. A method for obstacle avoidance for an Unmanned Aerial Vehicle (UAV), the method comprising:
   providing streaming video captured by a first camera of the UAV as a visual feed of the UAV's flight path to an operator of the UAV;
   analyzing the streaming video captured by the first camera to identify features in one or more image frames of the streaming video by:
   detecting a horizon;
   determining a presence of an object cluttering the horizon; and
   determining a percentage of a size of the object cluttering the horizon with respect to an area of one of the image frames;
   determining a score based on the features;
   selecting one of a plurality of different obstacle avoidance maneuvers based on the score; and
   performing the selected obstacle avoidance maneuver to alter the flight path of the UAV.

2. The method of claim 1, wherein the features include a perceived dimension of an object as it appears in the streaming video.

3. The method of claim 1, wherein the score indicates a presence of an object in the flight path.

4. The method of claim 3, wherein the score indicates a size of the object and a distance between the object and the UAV.

5. The method of claim 1, wherein analyzing the streaming video further comprises:
   determining a number of attributes of the object.

6. The method of claim 5, wherein the number of attributes includes at least one of a size of the object, one or more dimensions of the object, and a length of extension of the object along a bottom portion of the one or more image frames.

7. The method of claim 1, wherein the plurality of different obstacle avoidance maneuvers includes one or more of changing a direction of the UAV, changing an altitude of the UAV, adjusting a pitch of the UAV, adjusting a yaw of the UAV, adjusting a roll of the UAV, halting the UAV, or hovering the UAV in place.

8. The method of claim 1, wherein the plurality of different obstacle avoidance maneuvers includes one or more of notifying the operator, landing the UAV, returning the UAV to base, or transmitting data to the operator.

9. The method of claim 1, further comprising:
receiving a trigger to compute a new score;
rotating the first camera based on the trigger;
capturing a new image frame using the rotated first camera; and
computing the new score based on the new image frame.

10. The method of claim 1, further comprising:
receiving a trigger to compute a new score;
capturing a new image frame using the first camera; and
computing the new score based on a selected portion of the new image frame.

11. The method of claim 10, wherein the trigger is based on detecting that the UAV is turning in a first direction, and the selected portion of the new image frame corresponds to the first direction.

12. The method of claim 1, further comprising:
receiving a trigger to compute a new score;
activating a second camera on the UAV based on the trigger;
capturing a new image frame using the second camera; and
computing the new score based at least in part on the new image frame.

13. An Unmanned Aerial Vehicle (UAV) configured for obstacle avoidance, comprising:
a first camera;
one or more processors coupled to the first camera; and
a memory storing instructions that, when executed by the one or more processors, cause the UAV to:
provide streaming video captured by the first camera as a visual feed of the UAV's flight path to an operator of the UAV;
analyze the streaming video captured by the first camera to identify features in one or more image frames of the streaming video by:
detecting a horizon;
determining a presence of an object cluttering the horizon; and
determining a percentage of a size of the object cluttering the horizon with respect to an area of one of the image frames;
determine a score based on the features;
select one of a plurality of different obstacle avoidance maneuvers based on the score; and
perform the selected obstacle avoidance maneuver to alter the flight path of the UAV.

14. The UAV of claim 13, wherein the features include a perceived dimension of an object as it appears in the streaming video.

15. The UAV of claim 13, wherein the score indicates a presence of an object in the flight path.

16. The UAV of claim 15, wherein the score indicates a size of the object and a distance between the object and the UAV.

17. The UAV of claim 13, wherein execution of the instructions to analyze the streaming video further causes the UAV to:
determine a number of attributes of the object.

18. The UAV of claim 17, wherein the number of attributes includes at least one of a size of the object, one or more dimensions of the object, and a length of extension of the object along a bottom portion of the one or more image frames.

19. The UAV of claim 13, wherein the plurality of different obstacle avoidance maneuvers includes one or more of changing a direction of the UAV, changing an altitude of the UAV, adjusting a pitch of the UAV, adjusting a yaw of the UAV, adjusting a roll of the UAV, halting the UAV, or hovering the UAV in place.

20. The UAV of claim 19, wherein the plurality of different obstacle avoidance maneuvers includes one or more of notifying the operator, landing the UAV, returning the UAV to base, or transmitting data to the operator.

21. The UAV of claim 13, wherein execution of the instructions causes the UAV to further:
receive a trigger to compute a new score;
rotate the first camera based on the trigger;
capture a new image frame using the rotated first camera; and
compute the new score based on the new image frame.

22. The UAV of claim 13, wherein execution of the instructions causes the UAV to further:
receive a trigger to compute a new score;
capture a new image frame using the first camera; and
compute the new score based on a selected portion of the new image frame.

23. The UAV of claim 22, wherein the trigger is based on detecting that the UAV is turning in a first direction, and the selected portion of the new image frame corresponds to the first direction.

24. The UAV of claim 13, wherein execution of the instructions causes the UAV to further:
receive a trigger to compute a new score;
activate a second camera on the UAV based on the trigger;
capture a new image frame using the second camera; and
compute the new score based at least in part on the new image frame.

25. A non-transitory computer readable medium comprising instructions that, when executed by one or more processors of an Unmanned Aerial Vehicle (UAV), causes the UAV to perform operations comprising:
providing streaming video captured by a first camera of the UAV as a visual feed of the UAV's flight path to an operator of the UAV;
analyzing the streaming video captured by the first camera to identify features in one or more image frames of the streaming video by:
detecting a horizon
determining a presence of an object cluttering the horizon; and
determining a percentage of a size of the object cluttering the horizon with respect to an area of one of the image frames;
determining a score based on the features;
selecting one of a plurality of different obstacle avoidance maneuvers based on the score; and
performing the selected obstacle avoidance maneuver to alter the flight path of the UAV.

26. The non-transitory computer readable medium of claim 25, wherein the features include a perceived dimension of an object as it appears in the streaming video.

27. The non-transitory computer readable medium of claim 25, wherein execution of the instructions causes the UAV to perform operations further comprising:
receiving a trigger to compute a new score;
rotating the first camera based on the trigger;
capturing a new image frame using the rotated first camera; and
computing the new score based on the new image frame.

28. The non-transitory computer readable medium of claim 25, wherein execution of the instructions causes the UAV to perform operations further comprising:
receiving a trigger to compute a new score;
capturing a new image frame using the first camera; and computing the new score based on a selected portion of the new image frame.

29. The method of claim 28, wherein the trigger is based on detecting that the UAV is turning in a first direction, and the selected portion of the new image frame corresponds to the selected direction.

30. The non-transitory computer readable medium of claim 25, wherein execution of the instructions causes the UAV to perform operations further comprising:
   receiving a trigger to compute a new score;
   activating a second camera on the UAV based on the trigger;
   capturing a new image frame using the second camera; and
   computing the new score based on the new image frame.

* * * * *